Oct. 8, 1929.   N. H. ADAMS   1,730,443
METHOD OF UNITING METALS
Original Filed Oct. 5, 1922

Inventor:
Nathan H. Adams
by
His Attorney

Patented Oct. 8, 1929

1,730,443

UNITED STATES PATENT OFFICE

NATHAN H. ADAMS, OF SCHENECTADY, NEW YORK, ASSIGNOR TO GENERAL ELECTRIC COMPANY, A CORPORATION OF NEW YORK

METHOD OF UNITING METALS

Original application filed October 5, 1922, Serial No. 592,597. Divided and this application filed June 6, 1925. Serial No. 35,488.

The present application is a division of my application filed October 5, 1922, Serial No. 592,597.

The present invention comprises a method of joining metals to one another which partakes in some respects of the characteristics of resistance welding and in some respects of the characteristics of a soldering process. My invention is illustrated by a process of consolidating fine wires for the purpose of providing a terminal for braided flexible conductors. As a result of my process a rugged terminal can be made having substantially the physical properties of a solid member of homogeneous metal but which can be shown by magnification to be constituted of the individual wires joined to each other and associated with a residue of alloying metal which was introduced during the welding process.

Heretofore, difficulties have been encountered by the weakening and embrittling of stranded or braided conductors by the use of fluxes when welding, soldering or brazing terminals to conductors. When such operations are carried out in the open air copper wires become oxidized and in the presence of reducing gas, copper becomes brittle. As stranded conductors are particularly intended to be used in apparatus such as circuit breakers in which conductors frequently are subjected to motion, brittleness may soon lead to a break which may cause an expensive shut-down of large apparatus.

In accordance with my present invention a binder metal having but slight alloying affinity for the metal to be welded is introduced between the wire strands to be joined, which thereupon are pressed into contact under such conditions of temperature and pressure that the binder metal is largely eliminated and at the same time the surfaces thus brought into contact are joined or welded to each other. For example, when my improved process is applied to the provision of a terminal for flexible conductors consisting of stranded or braided fine copper wire, a film of lead-tin alloy in which lead predominates is placed between the respective strands of copper wire and the metal parts thus assembled are heated in a press to a temperature of about 750 to 950° C. preferably by passage of current across the assembled articles at a pressure sufficiently high to cause the lead-tin alloy to largely escape from between the strands and to cause the wires to be compacted into a dense bar having substantially the physical properties of a substantially homogeneous bar of copper.

Figure 1:
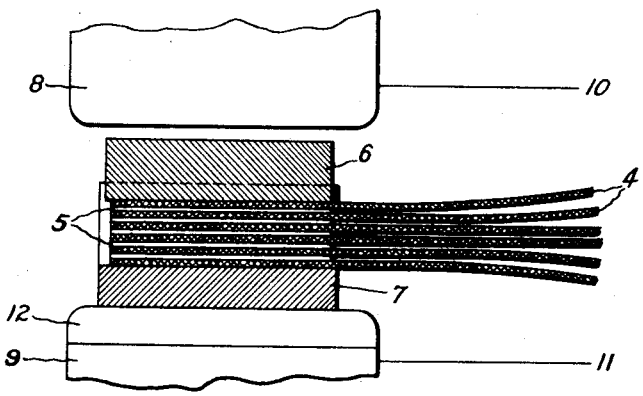
Figure 2:
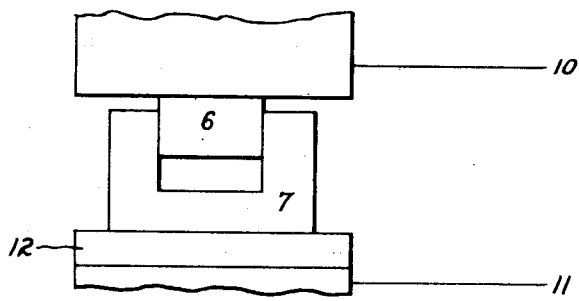
Figure 3:
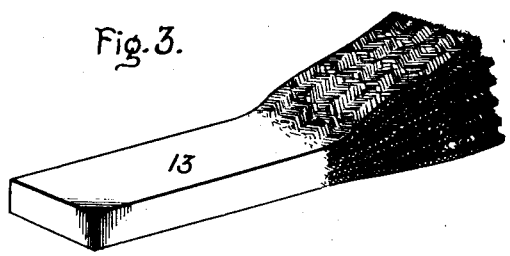

I have shown in Figs. 1 and 2 of the accompanying drawing somewhat diagrammatically an apparatus suitable for carrying out my invention and in Fig. 3 in perspective a terminal produced thereby.

The stranded ribbon-shaped conductors 4 of Fig. 1 consist of fine copper wires which, for example, may be about 10 mils in diameter. Between the strands are placed wafers 5 of an easily fusible metal having a moderate alloying affinity for copper. For example, I have used with success an alloy of nine parts lead and one part tin, although those proportions may be varied considerably. This alloy has a melting point of about 290° C. The wafers 5 may be about two mils in thickness. An alloy of this constitution is not suitable for ordinary soldering but the high pressure and high temperature conditions of the present process renders the alloy capable of causing the copper wires to be consolidated into a compact mass. The parts when assembled are placed between the members 6, 7 of a mold heated under a pressure sufficiently high to melt the wafers 5 and to soften the copper. I may use for this purpose a press adapted to convey a heating current through the mass. In the drawing, I have indicated diagrammatically electric terminals 8, 9 by which pressure may be applied. These terminals are connected to conductors 10, 11 preferably including between one of the mold members and the adjoining terminal a strip of material of relatively high resistance, for example a layer 12 consisting of graphite or carbon. A pressure of about two thousand pounds to the square inch ordinarily is satisfactory for the welding operation.

The temperature suitable for this compression and welding step ordinarily will lie within the limits of about 750 to 950° C., depending on the density desired in the terminal.

Most commonly I use a temperature of about 850° C. At this temperature which approaches the softening temperature of copper, the alloy 5 is highly fluid so that to a large degree it escapes from the mass and is vaporized. Apparently the alloy acts as a flux to put the metal surfaces into proper condition for welding. Oxide on the surface of the copper wires is removed by the melted flux metal. Oxidized copper may be welded as readily as clean, unoxidized copper.

The welded portion 13 of the conductor may be machined as shown in Fig. 3 to remove surface inequalities. The portion 13 presents to the unaided eye the appearance of a sound homogeneous metal and indeed, has substantially the properties of homogeneous copper. Under the microscope it can be observed to consist of a densely compacted mass in which the original wires or other components are still detectable in most cases surrounded by a film of alloy.

The compressed mass becomes more dense and homogeneous as the pressure and temperature of the operation are raised.

What I claim as new and desire to secure by Letters Patent of the United States, is:—

1. The method of welding metal articles to each other which consists in introducing between the surfaces to be welded a more easily fusible metal having a slight alloying affinity for said surfaces and thereupon pressing said surfaces into contact at a temperature materially above the melting point of the more easily fusible metal at a pressure high enough to largely eliminate said easily fusible metal.

2. The method of welding copper which consists in introducing between the articles to be welded an alloy containing a preponderant amount of lead and a lesser amount of tin and thereupon pressing said articles together at a temperature materially above the melting point of said alloy at a pressure high enough to largely eliminate said alloy.

3. The method of welding stranded filamentary copper conductors which consists in introducing between the strands to be welded an alloy containing about nine parts lead and one part tin, and pressing said articles with a pressure of about 2000 pounds per square inch at a temperature within the range of about 750° to 950° C.

4. The method of welding together stranded filamentary copper conductors which consists in placing between said strands films of a binder consisting largely of lead and containing a metal alloyable with copper, and applying at a temperature just below the melting point of copper a pressure high enough to compact said conductors to a dense and substantially homogeneous condition.

5. The method of uniting filamentary bodies of copper into a compact mass which consists in surrounding said bodies by an easily fusible metal slightly alloyable with said bodies and then pressing said bodies together at a temperature above the melting point of said easily fusible metal, but below the melting point of copper at a pressure high enough to eliminate largely said easily fusible metal and produce a dense substantially homogeneous metal.

6. The method of uniting the wires of stranded copper conductors to form a compact plate which consists in introducing a film of lead-tin alloy upon the surface of said conductors and then pressing said wires together at a temperature and pressure so high that said alloy is in large part eliminated said wires to be consolidated or welded together by the residue of said alloy.

In witness whereof, I have hereunto set my hand this 4th day of June, 1925.

NATHAN H. ADAMS.